Sept. 14, 1954

N. E. LOWTHER 2,688,887

HYDRAULICALLY CONTROLLED REVERSE GEAR

Filed Feb. 20, 1953

INVENTOR.
Noel E Lowther
BY
James H. Littlepage
ATTORNEY.

Sept. 14, 1954      N. E. LOWTHER      2,688,887

HYDRAULICALLY CONTROLLED REVERSE GEAR

Filed Feb. 20, 1953      2 Sheets-Sheet 2

INVENTOR.
Noel E. Lowther
BY
ATTORNEY.

Patented Sept. 14, 1954

2,688,887

UNITED STATES PATENT OFFICE 2,688,887

HYDRAULICALLY CONTROLLED REVERSE GEAR

Noel E. Lowther, St. Louis, Mo., assignor of fifty per cent to Charles G. Emerling, St. Louis, Mo.

Application February 20, 1953, Serial No. 338,052

15 Claims. (Cl. 74—812)

This invention relates to unidirectional drive gearing and, more particularly, to a gear through which a driving shaft is rotated in one direction only by rotation of a driven shaft in either of two opposite directions.

The object of the invention is to provide a gear capable, among other uses, of driving refrigerating mechanism in a railway freight car. To meet basic reuqirements, the gear must be unidirectional in its output no matter what the direction of its input drive might be so that the running direction of the freight car may be reversed without corresponding reversal of the rotational direction of the mechanism driven by the gear.

Another object of the invention is to provide a unidirectional drive gear, the driving connection through which is normally disengaged when the input is stationary, but through which a driving connection is established after predetermined rotation of the drive to the gear. Since operation of refrigerating mechanism and auxiliary equipment for a railway car imposes a load of a considerable number of horsepower on the car axle, an object is to provide a gear through which the load is disconnected from the car axle until after the car gets underway for a predetermined time and reaches a predetermined minimum speed. By the same expedient, the driven mechanism is isolated from the tortuous strains when the car is bumped off from a standstill, and momentary operation of the mechanism is avoided during the brief movements of switching, backing and filling.

Another object of this invention is to provide a unidirectional gear with a standing disengaged drive, but through which drive establishes slowly and steadily upon attainment of predetermined running time and speed of its input drive, the object being to avoid slamming in of the gearing connection and the resultant sudden start of the mechanism driven through the gear and the imposition of catastrophic torque loads on the associated rotating elements. It is likewise intended that the drive through the gear be disengageable with the same slow, easy and smooth characteristics.

Yet another object is to provide a unidirectional output gear wherein the drive through it, having once been established after predetermined rotation of its input drive, may be slowly and smoothly disengaged or re-established in accordance with the demands of a mechanism driven thereby. In a typical environment, wherein the gear connects a shaft driven by a freight car axle to a refrigerating mechanism, any one of several conditions might occur to require cessation of the drive; i. e., the requirements for refrigeration may not exist or may be satisfied; or the freight car might run so fast that it would be undesirable to operate the refrigerating mechanism at a corresponding rate. Accordingly it is an object to provide a normally disengaged gear, the drive through which is established under the control of an operating member after the input drive to the gear occurs for a predetermined time, and an over-riding control for arbitrarily disengaging and re-engaging the drive through the gear.

Among the more specific objects are the provision of a right-angle gear having a unidirectionally rotating driven shaft; a combined gear and clutch assembly in which the clutching members are self-adjusting and the operation of its clutching members necessarily maintains the unidirectional output characteristics of the gear, regardless of the direction of the gear input drive; and with it all, a gear capable of year-in, year-out prodigious running.

These and other objects will be apparent from the following specification and drawings, in which.

Figure 1:
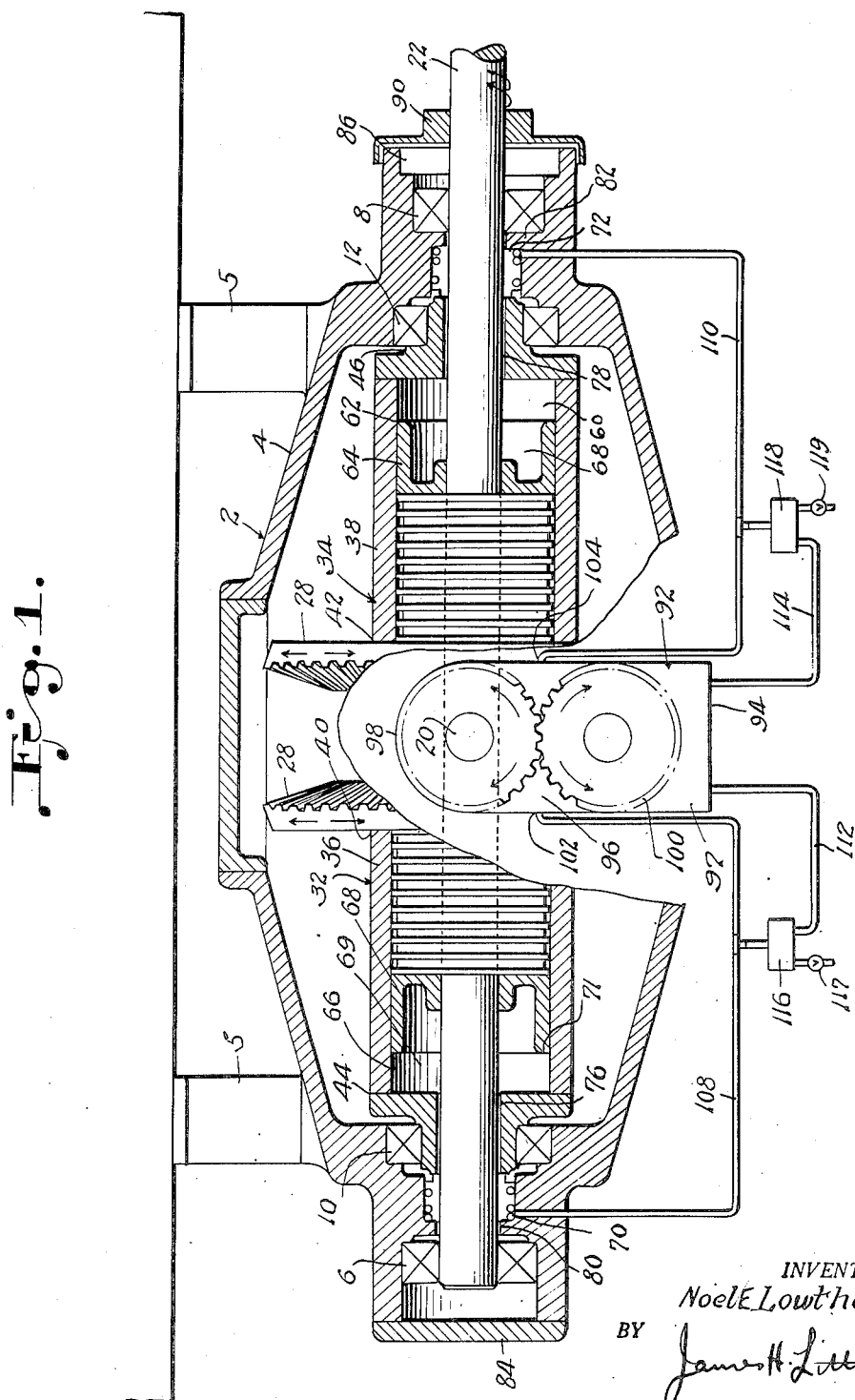
Fig. 1 is a side elevation, partially broken away, showing the gear.

Referring now to the drawings in which right reference numerals denote similar elements the gear indicated generally at 2 is enclosed within an elongate hollow casing 4 having mounting supports 5. At each end of casing 4 are similar outer end bearings 6 and 8, and coaxially spaced inwardly of the outer end bearings are similar inner end bearings 10 and 12, all of these bearings being suitably supported in recesses within the casing. Mounted with its axis at right angles to the axis of the end bearings is a central bearing 14, and generally opposite the central bearing is an intermediate bearing 16, the latter being coaxial with outer end bearings 6 and 8 and inner end bearings 10 and 14. Intermediate bearing 16 is supported on a web 18.

Rotatably supported in central bearing 14 is a driving shaft 20, it being understood that the driving shaft is connectable to a suitable source of power the most important characteristic of which is that the driving shaft is subject to alternate rotation from time to time in either of two opposite directions. Such a drive occurs, for instance, when driving shaft 20 is geared to the axle of a railway car and the reversal of rotational direction of the driving shaft results from reversal of direction of running of the car. Rotatably mounted within casing 4 in outer end bearings 6 and 8 and intermediate bearing 16 is a driven shaft 22 which may, for example, be connected with a machine such as a refrigerator compressor or a generator. The object is that the driven shaft shall rotate in one direction only, regardless of the rotational direction of the driving shaft and, as previously set forth, the driven shaft shall slowly and smoothly commence rotation only after predetermined rotation of the driving shaft.

Figure 2:
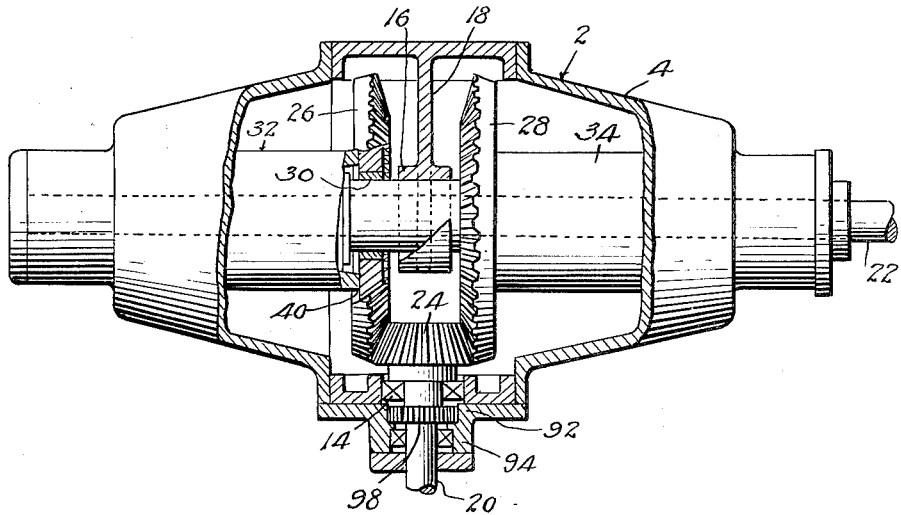
Fig. 2 is a horizontal section through the gear showing the gear parts.

Affixed on the inner end of driving shaft 20 is a bevel pinion 24 constantly meshing with 2 oppositely facing bevel ring gears 26 and 28, the latter being rotatably mounted by bearings, one of which is indicated at 30 in Fig. 2, on driven shaft 22.

Respectively associated with ring gears 26 and 28 are a pair of clutches 32 and 34 which include cylindrical supports 36 and 38. The inner end of cylindrical support 36 is rigidly affixed to the back of ring gear 26 as indicated at 40 and the inner end of cylindrical support 38 is rigidly affixed to the back of ring gear 28 as indicated at 42. The outer reduced end 44 of cylindrical support 36 is rotatably supported in the adjacent inner end bearing 10 while the outer reduced end 46 of cylindrical support 38 is rotatably supported in the adjacent inner end bearing 12. Since the separable inner elements of clutches 32 and 34 are identical, only one set will be detailed.

Figure 3:
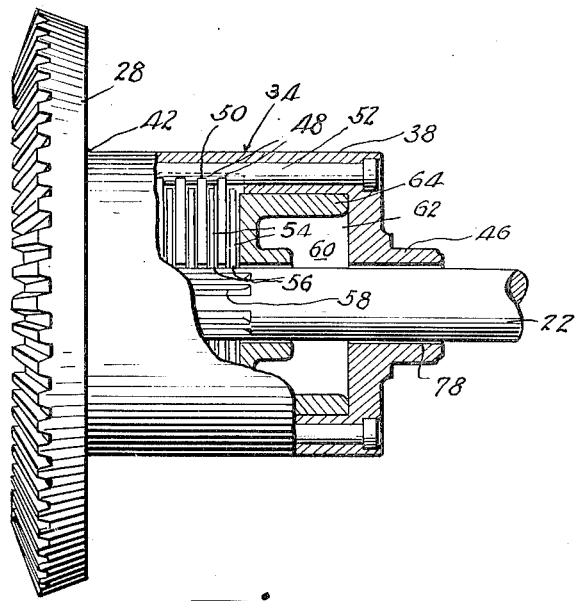
Fig. 3 is a detailed view, partially in section, showing one of the ring gears and associated clutch mechanism.

As shown in Fig. 3, clutch 34 includes a set of spaced driving plates 48 having their outer peripheries splined as indicated at 50 on rods 52, the latter being affixed within the wall of cylindrical support 38 so that, while driving clutch plates 48 rotate with cylindrical support 38 and ring gear 28, they nevertheless are free to slide axially of the assembly. Interdigitating with driving clutch plates 48 is a set of driven clutch plates 54, the inner peripheries of which are splined as indicated at 56 on ribs 58 on driven shaft 22, it being apparent that while driven clutch plates 54 rotate with driven shaft 22, they nevertheless may also move axially of the assembly. The important characteristics of the clutch plates are that as the driving and driven ones are forced together, there is an initial slipping but smooth driving torque established therebetween, and when the plates are pressed together with sufficient force a non-slip drive is established. When the compressing force is released the driving and driven clutch plates are, of course, free to rotate relatively. These characteristics are well known in multiple disk clutches of the general type disclosed.

Referring now to the righthand portion of Fig. 3, it will be seen that the outer or righthand of cylindrical clutch support 38 forms a cylinder 60 for a fluid motor indicated generally at 62, the piston 64 of which is movable axially of the assembly so that when it moves to the left, it engages the outermost one of driven clutch plates 54 and, upon further movement to the left, forces all the clutch plates together into driving engagement. Similarly associated with the opposite clutch 32 is an identical fluid motor indicated generally at 66, the piston 68 of which, when driven, moves to the right in cylinder 69 so as to force the associated clutch plates into driving engagement. Formed in casing 4 outwardly of inner end bearings 10 and 12 respectively are chambers 70 and 72 which connect by leak passages 76 and 78 with the cylinders 69 and 60 of fluid motors 66 and 62 respectively. Near the lefthand end of casing 4 is a liquid seal 80 and the lefthand end of the casing is closed by a cap 84. The righthand end of fluid chamber 72 is closed by liquid seal 82 and the righthand end assembly of casing 4 includes packing 86 and sealing washer 90.

As will be seen hereinafter, only one of clutches 32 or 34 may be actuated to driving condition at any given instant. Selective actuation of clutches 32 and 34 is accomplished by a gear pump generally indicated at 92 enclosed within a shell 94 affixed on casing 4 and surrounding driving shaft 20. Gear pump 92 includes a pump chamber 96, reservoir 97, a driver gear 98 affixed on and rotating with driving shaft 20 and a follower gear 100. Ports 102 and 104 in respectively opposite sides of pump gear 94 are arranged so that while one of the ports operates as an output port, the other is an input port. Thus, if driver gear 98 rotates counterclockwise, port 104 is the output port while port 102 is the input port. Port 104 is connected by a fluid conduit 110 to cylinder 60 of fluid motor 62 via fluid chamber 72 and leak passage 78 while fluid conduit 108 is connected to cylinder 69 of fluid motor 66 via fluid chamber 70 and leak passage 76. The fluid system contains oil or other suitable hydraulic fluid. The liquid delivery of gear pump 92 at the points of entry of the fluid conduits into the fluid motor cylinders is relatively small as compared with the volumes of the cylinders and with the distance of movement required for the pistons until they exert sufficient force on the clutch plates to bind them together. It will thus be seen that driving shaft, at the start of its rotation in any given direction, must turn a number of times until sufficient liquid is delivered to one of the fluid motors to actuate the associated clutch into driving engagement. In addition, taking into account the back leakage inherent in a gear pump of the type described, operation of the gear pump at a very low speed will not build up sufficient liquid pressure on either one of the fluid motor pistons to force the associated clutch plates into driving engagement, there being normally a sufficient load on driven shaft 22 to hold it stationary during very slow turning movements of driving shaft 20.

External control of the gear is accomplished by means of a pair of bypass return lines 112 and 114 respectively branching from fluid conduits 108 and 110 and returning to pump reservoir 97. Normally closed valves 116 and 118 in bypass return lines 112 and 114, respectively, may be opened so as to reduce the pressure of oil delivered by gear pump 92 to either one of fluid motors 62 or 66.

In operation it will be assumed driving shaft 20 is stationary at the start of an operating cycle. With driving shaft 20 stationary, there is no appreciable oil pressure at either of ports 102 or 104 and consequently, no significant oil pressure in the cylinders of fluid motors 66 or 62, and no resultant pressure on the plates in either of clutches 32 or 34. Driven shaft 22 is thus completely disengaged from any driving connection with driving shaft 20. As soon as driving shaft 20 starts rotating, clockwise, for instance, oil is pumped through port 104, fluid conduit 110, fluid chamber 72, leak passage 78 and into cylinder 60 of fluid motor 62, thereby forcing piston 64 to the left. After driving shaft 20 has undergone enough revolutions that sufficient speed to overcome inherent back leakage in gear pump 92, the oil pumped into cylinder 60 gradually builds up sufficient pressure so that piston 64 smoothly forces driving and driven clutch plates 48 and 54 into driving engagement. Meanwhile, the oil drawn into port 102 of gear pump 92 is withdrawn through fluid conduit 108, liquid chamber 70 and leak passage 76 from cylinder 69 of fluid motor 66, thereby drawing piston 68 back until its skirt 69 engages the end of cylinder support 36, and the driving and driven plates of clutch 32 remain free spinning. Under this condition ring gear 28 is drivingly connected to driven shaft 22 through clutch 34 while ring gear 26 is disengaged from driven shaft 22 through clutch 32. Driven shaft thus rotates in the direction of the arrow at the righthand end of Fig. 1. Let it be assumed that driving shaft 20 stops and reverses so as to rotate in counterclockwise direction as seen in Fig. 1. Oil is first withdrawn from the cylinder of fluid motor 62 and after sufficient rotation of gear pump 92 by driving shaft 20, the oil withdrawn from fluid motor 62 is pumped into fluid motor 66 so as to force its piston to the right until it engages the associated clutch plates and finally presses them into driving engagement. Under this circumstance the driving shaft 20 is driven through piston 24, ring gear 26 and clutch 32, to driven shaft 22 and thus the latter again rotates in the same direction of the arrow at the righthand end of Fig. 1.

While bypass control valves 116 and 118 may be automatically actuated in accordance with the demands of the machinery connected to driven shaft 22, or some other external factor, it will be assumed for purposes of present consideration that the valves have manual controls 117 and 119, respectively. Thus during the normal operation described immediately above, if valve 116 be opened, the oil pressure normally fed to fluid motor 66 will be released and oil output through port 102 will be returned through valve 116 and bypass return line 112 to pump chamber 96, this release of pressure thereby releasing the pressure of piston 68 on the disk of clutch 32 so as to allow the driving and driven disks to spin freely relative to one another and thus dis-establish the normal drive through the gear. It will be apparent also that, by partially opening valves 116 and 118 so as to allow controlled leakage of the oil back through the bypass return lines, it is possible to predetermine the number and speed of rotation required of driving shaft 20 to operate gear pump 92 so as to build up sufficient pressure to actuate either or both of the clutches. Likewise, a non-symmetrical operation may be predetermined by cracking one only of bypass control valves 116 and 118, or by cracking one more than the other.

The invention detailed above is not limited to the precise structure and arrangement of elements but is intended to cover all substitutions, equivalents and modifications within the scope of the following claims.

I claim:

1. A gear mechanism comprising in combination, a driving shaft, a driving gear rotating with said driving shaft, a pair of driven gear means constantly meshing with said driving gear and rotating in respectively opposite directions to one another upon rotation of said driving gear in either direction, a driven shaft, a pair of normally disengaged clutch means selectively engageable between said driven gear means and said driven shaft; fluid motor means for operating said clutch means, a reversible fluid pump moving with said driving shaft, and fluid connections between said pump and said motor means whereby to operate one or the other of said clutch means in response to rotation of said driving shaft in one direction or the other.

2. A gear mechanism comprising in combination, a reversible driving shaft, a driving gear rotating with said driving shaft, a pair of driven gear means constantly meshing with said driving gear and rotating in respectively opposite directions to one another upon rotation of said driving gear in either direction, a driven shaft, clutch means engageable between said driven gear means and said driven shaft, and reversible fluid motor means for selectively engaging said clutch means in accordance with the direction of rotation of said driving shaft, whereby to provide one-way drive for said driven shaft.

3. In combination, a driving shaft rotatable in either of two opposite directions, a driving gear rotating with said driving shaft, a pair of oppositely arranged driven gear means constantly meshing with said driving gear and rotating in respectively opposite directions to one another upon rotation of said driving gear in either direction, a driven shaft, a pair of clutch means each connected with said driven shaft and respectively connected to said driving gear means, bias means normally biasing said clutch means to disengagement, a pair of fluid motor means respectively associated with said clutch means for overcoming said bias means and engaging the clutch upon energization of the fluid motor means by pressure fluid, a reversible fluid pump driven by and rotating with said drive shaft, said fluid pump having a pair of ports through which pressure fluid flows outwardly selectively in accordance with the direction of rotation of said pump, and fluid connections respectively between said ports and said fluid motors whereby to engage one or the other of said clutch means upon rotation of said driving shaft in one or the other directions.

4. In combination, a driving shaft rotatable in either of two opposite directions, a driving gear rotating with said driving shaft, a pair of oppositely arranged driven gear means constantly meshing with said driving gear and rotating in respectively opposite directions to one another upon rotation of said driving gear in either direction, a driven shaft, a pair of normally disengaged clutch means each connected with said driven shaft and respectively connectedy to said driving gear means, a pair of fluid motor means respectively associated with said clutch means for and respectively engaging the clutch means upon energization of the fluid motor means by pressure fluid, a reversible fluid pump driven by and rotating with said drive shaft, said fluid pump having a pair of ports through which pressure fluid flows outwardly selectively in accordance with the direction of rotation of said pump, and fluid connections respectively between said ports and said fluid motors whereby to engage one or the other of said clutch means upon rotation of said driving shaft in one or the other directions.

5. In combination, a driving shaft rotatable in either of two opposite directions, a driving gear rotating with said driving shaft, a pair of oppositely arranged driven gear means constantly meshing with said driving gear and rotating in respectively opposite directions to one another upon rotation of said driving gear in either direction, a driven shaft, a pair of normally disengaged clutch means each connected with said driven shaft and respectively connected to said driving gear means, a pair of cylinder and piston fluid motor means respectively associated with said clutch means for respectively engaging the clutch means upon energization of the fluid motor means by pressure fluid, a reversible fluid pump driven by and rotating with said drive shaft, said fluid pump having a pair of ports through which pressure fluid flows outwardly selectively in accordance with the direction of rotation of said pump, and fluid connections respectively between said ports and said fluid cylinders whereby to operate one of said motor means so as to engage one of said clutch means upon rotation of said driving shaft while tending to withdraw fluid from the other of said cylinders.

6. In combination, a driving shaft rotatable in either of two opposite directions, a driving pinion rotating with said driving shaft, a pair of driven ring gears constantly meshing with said driving gear and oppositely arranged so as to rotate in respectively opposite directions to one another upon rotation of said driving pinion in either direction, a driven shaft rotatably supporting said ring gears, a pair of clutches each having one element rotating with said driven shaft and each having another element rotating with one of said ring gears, the elements of said clutches normally being disengaged from one another, a pair of fluid motor means respectively associated with said clutches for engaging the elements thereof upon energization of the fluid motor means by pressure fluid, a reversible fluid pump driven by and rotating with said drive shaft, said fluid pump having a pair of ports through which pressure fluid flows outwardly selectively in accordance with the direction of rotation of said pump, and fluid connections respectively between said ports and said fluid motor means whereby to engage one or the other of said clutch means upon rotation of said driving shaft in one or the other directions.

7. In combination, a driving shaft rotatable in either of two opposite directions, a driving gear rotating with said driving shaft, a pair of oppositely arranged driven gear means constantly meshing with said driving gear and rotating in respectively opposite directions to one another upon rotation of said driving gear in either direction, a driven shaft, a pair of normally disengaged clutch means each connected with said driven shaft and respectively connected to said driving gear means, a pair of fluid motor means respectively associated with said clutch means for respectively engaging the clutch means upon energization of the fluid motor means by pressure fluid, a reversible fluid pump driven by and rotating with said drive shaft, said fluid pump having a chamber and also having a pair of ports through which pressure fluid flows inwardly or outwardly in accordance with the direction of rotation of said pump, fluid conduits respectively connecting said ports and said fluid motor means whereby to engage one or the other of said clutch means upon rotation of said driving shaft in one or the other directions, and means associated with each of said fluid conduits for controlling the passage of fluid therethrough.

8. The combination claimed in claim 7, the last-named means comprising a fluid bypass line connecting each of said fluid conduits with said pump chamber, and valve means for controlling said fluid bypass lines.

9. A gear mechanism comprising, in combination, a casing, a drive shaft rotatably mounted centrally in said casing, a pinion in said casing fixed on said drive shaft, a driven shaft rotatably mounted in said casing at right-angles to said driving shaft, a pair of ring gears rotatably supported on said driven shaft, said ring gears being on respectively opposite sides of said pinion and in constant mesh therewith, a pair of clutches each having driving and driven elements, the driving elements of said clutches being respectively supported on said ring gears for rotation therewith and the driven elements of said clutches being respectively supported on said driven shaft for rotation therewith, one of each of said driving and driven elements being forceable towards the other for establishing drive therethrough and being releasable from the other for establishing relative free-running therebetween, a pair of fluid motors respectively associated with said clutches, each having a cylinder supported in said casing and containing a piston drivingly connected with the moveable one of the associated clutch elements whereby to force the associated clutch elements into engagement with one another upon input of fluid under pressure to said cylinder and to release the associated clutch elements from one another upon release of fluid from said cylinder, a reversible fluid pump drivingly connected to said driving shaft and rotating therewith, said pump having a chamber and a pair of ports each adapted to output or return fluid from or to said chamber respectively in accordance with the direction of rotation of said driving shaft, and fluid conduits respectively connecting said ports to said cylinders whereby to feed fluid under pressure to one or the other of said cylinders while releasing fluid from the other cylinder in accordance with the direction of rotation of said driving shaft, whereby to establish drive in one direction only of said driven shaft upon rotation of said driving shaft in either direction.

10. A gear mechanism comprising, in combination, a casing, a drive shaft rotatably mounted centrally in said casing, a pinion in said casing fixed on said drive shaft, a driven shaft rotatably mounted in said casing at right-angles to said driving shaft, a pair of ring gears rotatably supported on said driven shaft, said ring gears being on respectively opposite sides of said pinion and in constant mesh therewith, a pair of clutches each having driving and driven elements, the driving elements of said clutches being respectively supported on said ring gears for rotation therewith and the driven elements of said clutches being respectively supported on said driven shaft for rotation therewith, one of each of said driving and driven elements being forceable upon application of predetermined force towards the other for establishing drive therethrough and being releasable from the other for establishing relative free-running therebetween, a pair of fluid motors respectively associated with said clutches, each having a cylinder supported in said casing and containing a piston drivingly connected with the moveable one of the associated clutch elements whereby to force the associated clutch elements into engagement with one another upon input of fluid under pressure to said cylinder and to release the associated clutch elements from one another upon release of fluid from said cylinder, a reversible fluid pump drivingly connected to said driving shaft and rotating therewith, said pump having a chamber and a pair of ports each adapted to output or return fluid from or to said chamber respectively in accordance with the direction of rotation of said driving shaft, and fluid conduits respectively connecting said ports to said cylinders whereby to feed fluid under pressure to one or the other of said cylinders while releasing fluid from the other cylinder in accordance with the direction of rotation of said driving shaft, whereby to establish drive in one direction only of said driven shaft upon rotation of said driving shaft in either direction, the volume of fluid delivery of said pump and said fluid conduits being relatively small as compared with the volume of said cylinders, whereby said clutch elements are forced into operative engagement with one another only after said driving shaft undergoes a predetermined number of rotations.

11. A gear mechanism comprising, in combination, a casing, a drive shaft rotatably mounted centrally in said casing, a pinion in said casing fixed on said drive shaft, a driven shaft rotatably mounted in said casing at right-angles to said driving shaft, a pair of ring gears rotatably supported on said driven shaft, said ring gears being on respectively opposite sides of said pinion and in constant mesh therewith, a pair of clutches each having interdigitating driving and driven disks, the driving disks of each of said clutches being respectively splined on a spider affixed on an associated one of said ring gears for rotation therewith and the driven disks of each of said clutches being respectively splined on said driven shaft for rotation therewith, said driving and driven elements being engageable towards the other upon application of predetermined force for establishing drive therethrough and being releasable from the other for establishing relative free-running therebetween, a pair of fluid motors each having a cylinder supported on the associated one of said spiders and containing a piston drivingly connected with the associated clutch disks whereby to force the associated clutch disks into engagement with one another upon input of fluid under pressure to said cylinder so as to move said piston for a predetermined distance and with said predetermined force and to release the associated clutch disks from one-another upon release of fluid from said cylinder, a reversible fluid pump drivingly connected to said driving shaft and rotating therewith, said pump having a chamber and a pair of ports each adapted to output or return fluid from or to said chamber respectively in accordance with the direction of rotation of said driving shaft, and fluid conduits respectively connecting said ports to said cylinders whereby to feed fluid under pressure to one or the other of said cylinders while releasing fluid from the other cylinder in accordance with the direction of rotation of said driving shaft, whereby to establish drive in one direction only of said driven shaft upon rotation of said driving shaft in either direction, the delivery of said pump to said cylinders being relatively low with respect to the distance and force of movement of said pistons required to engage said driving and driven clutch disks, whereby to provide a dash-pot time delay relationship between the starts of the driving and driven shafts.

12. A gear mechanism comprising, in combination, a casing, a drive shaft extending into and rotatably mounted centrally in said casing, a pinion fixed on the inner end of said drive shaft, a driven shaft rotatably mounted in said casing at right-angles to said driving shaft and having one end extending outwardly from said casing, a pair of ring gears rotatably supported on said driven shaft, said ring gears having teeth facing said pinion on respectively opposite sides thereof and in constant mesh therewith, a pair of clutches respectively associated with said ring gears, each having a cylindrical spider affixed to the back of the associated ring gear and coaxially surrounding said driven shaft, a set of driving disks splined to each of said spiders for rotation therewith and a set of interdigitating driven disks splined on said driven shaft for rotation therewith, said driving and driven disks being forceable towards the other for establishing drive therethrough and being releasable from the other for establishing relative free-running therebetween, a pair of fluid motors respectively associated with said clutches, each having a cylinder formed in said spider and containing a piston drivingly connected with the associated clutch disks whereby to force the associated clutch disks into engagement with one another upon input of fluid under pressure to said cylinder and to release the associated clutch disks from one-another upon release of fluid from said cylinder, a gear rotating with said driving shaft, said pump having a chamber and a pair of ports each adapted to output or return fluid from or to said chamber respectively in accordance with the direction of rotation of said driving shaft, and fluid conduits respectively connecting said ports to said cylinders whereby to feed fluid under pressure to one or the other of said cylinders while releasing fluid from the other cylinder in accordance with the direction of rotation of said driving shaft, whereby to establish drive in one direction only of said driven shaft upon rotation of said driving shaft in either direction.

13. The combination claimed in claim 12 and adjustable means for controlling the pressure of fluid output from said pump to said cylinders.

14. In the combination claimed in claim 12, a fluid bypass line connecting each of said fluid conduits and said pump chamber, and valve means in said fluid bypass lines for opening and closing the same.

15. A gear mechanism comprising, in combination, an elongate casing having coaxial outer and inner end bearings in each end thereof and a central bearing at right angles to the axis of the end bearings, a drive shaft rotatably mounted in said central bearing, a pinion in said casing fixed on the inner end of said drive shaft, a driven shaft rotatably mounted in said outer end bearings and extending longitudinally through said casing from end to end thereof, a pair of ring gears rotatably supported on said driven shaft generally centrally of said casing, said ring gears being on respectively opposite sides of said pinion and in constant mesh therewith, a pair of elongate cylindrical clutch supports, each having one end affixed to one of said ring gears and an opposite end rotatably supported in the adjacent one of said inner end bearings in said casing, said clutch supports coaxially surrounding said driven shaft and respectively enclosing clutch chambers therein, a plurality of interdigitating driving and driven plates, the driving plates of said clutches being splined in said clutch supports for rotation therewith and axial movement therein and the driven plates of said clutches being respectively splined on said driven shaft for rotation therewith and for axial movement therein, said driving and driven plates being forceable towards the other for establishing drive therethrough and being releasable from the other for establishing relative free-running therebetween, a pair of fluid motors respectively associated with said clutches, each having a cylinder formed in the outer end of one of said cylindrical clutch supports and containing a piston drivingly connected with the clutch plates whereby to force the associated clutch plates into engagement with one another upon input of fluid under pressure to said cylinder and to release the associated clutch plates from one another upon release of fluid from said cylinder, a gear pump drivingly connected to said driving shaft and rotating therewith, said pump having a chamber and a pair of ports each adapted to output or return fluid from or to said chamber respectively in accordance with the direction of rotation of said driving shaft, and fluid conduits respectively connecting said ports to said cylinders whereby to feed fluid under pressure to one or the other of said cylinders while releasing fluid from the other cylinder in accordance with the direction of rotation of said driving shaft, whereby to establish drive in one direction only of said driven shaft upon rotation of said driving shaft in either direction.

References Cited in the file of this patent

UNITED STATES PATENTS

| Number | Name | Date |
|---|---|---|
| 1,018,972 | Herman | Feb. 27, 1912 |
| 2,043,077 | Stewart | June 2, 1936 |
| 2,351,013 | Carpenter | June 13, 1944 |